United States Patent [19]

Legrand et al.

[11] Patent Number: 4,896,866

[45] Date of Patent: Jan. 30, 1990

[54] DOUBLE-ACTING SHOCK ABSORBER

[75] Inventors: Jean-Claude Legrand, Reding; Gérard Prevot, Willerwald, both of France

[73] Assignee: Ferco International, Sarrebourg, France

[21] Appl. No.: 201,873

[22] Filed: Jun. 3, 1988

[30] Foreign Application Priority Data

Jun. 11, 1987 [FR] France .................. 87 08317

[51] Int. Cl.[4] ............................ F16F 5/00; F16F 9/18
[52] U.S. Cl. ............................ 267/64.26; 188/322.19; 267/127
[58] Field of Search .................. 267/64.26, 64.11, 113, 267/127; 188/297, 311, 317, 318, 322.19; 92/51, 52, 117 R, 117 A; 184/18

[56] References Cited

U.S. PATENT DOCUMENTS 3,214,155 10/1965 Leavell ..................... 267/64.11 X
4,662,486 5/1987 Stenberg ..................... 188/318 X
4,702,463 10/1987 Krautkramer ............... 267/64.26

FOREIGN PATENT DOCUMENTS 2583844 12/1986 France .
56-52639 5/1981 Japan .
242547 11/1925 United Kingdom .
615549 1/1949 United Kingdom .
2123522 2/1984 United Kingdom .

OTHER PUBLICATIONS

Patent Abstracts of Japan, vol. 5, No. 112, Jul. 21, 1981.

Primary Examiner—Robert J. Oberleitner
Attorney, Agent, or Firm—Sandler & Greenblum

[57] ABSTRACT

The double-acting shock absorber producing the throttling of a fluid flowing through a constricted passage for damping out a movement in constructed, in combination of, a fixed piston (2) and a fixed cylinder (3) cooperating both with a movable member (4). This movable member has two axially aligned portions, that is, an upper portion (5) and a lower portion (6), the upper portion having a cylindrical cavity in which the fixed piston (2) is slidably fitted, and the lower portion having the configuration of a piston slidably engaged in the fixed cylinder.

29 Claims, 2 Drawing Sheets

DOUBLE-ACTING SHOCK ABSORBER

BACKGROUND OF THE INVENTION

1. FIELD OF THE INVENTION

The present invention relates to double-acting shock absorbers and has specific reference to a double-acting shock absorber for throttling a fluid flowing through a narrow passage for damping out a movement.

This invention is applicable to various industrial fields in general, wherever it is required to damp out a movement of a part in relation to another part.

2. THE PRIOR ART

Conventional and hitherto known shock absorbers, notably those utilized on land vehicles, comprise as a rule a closed cylinder in which a piston is adapted to slide while throttling a fluid, this piston being connected to a rod extending through one of the cylinder ends. Thus, according to the particular configuration of the elements concerned, the piston rod and the cylinder of the shock absorber are rigidly connected the one to a fixed member and the other to a movable member, or vice versa. These shock absorbers operate on the principle of the inertia effect produced by a fluid flowing through a throttling or the like. In this case and for this purpose, the shock absorber comprises two chambers interconnected by a conduit of relatively reduced diameter, the piston movement causing the fluid to be transferred from one chamber to the other chamber. Many modified versions of the conventional configuration of shock absorbers of this type are known in the art, notably in connection with the chambers containing the fluid which, on the other hand, may be either liquid or gaseous. Thus, according to a modified form of embodiment, the piston divides the inner space of the cylinder into two chambers and comprises in addition one or two conduits for transferring the fluid between these chambers. In other known constructions the cylinder is double walled and contains a fluid which can flow through throttling passages from the external chamber to the central chamber.

With this specific configuration, this type of shock absorber is not suited for guiding the movement of a movable member in relation to a fixed member. As a rule, this guiding function is devolved to other means interconnecting said movable and fixed members.

It is also known to provide shock absorbers having a piston retained by two piston rods disposed in mutual axial alignment, each rod extending through one of the cylinder ends. Under these conditions, in many instances the ends of the two rods are rigidly connected to the fixed member, so that the movable member can be guided in relation to said fixed member via the cylinder. However, it is observed that this guiding action can only take place along particularly short bearing surfaces, notably in the piston cylinder fitting surfaces and in the orifices machined in the end plates of the cylinder and permitting the passage of the piston rods. Moreover, due to be necessity of obtaining a good fluid-tightness along each one of said bearing surfaces, the efforts exerted perpendicularly to the cylinders and piston rods must necessarily be kept within relatively low limits.

SUMMARY OF THE INVENTION

The present invention is directed to provide a double-acting shock absorber for throttling a fluid flowing through a narrow or constricted passage for the purpose of damping out a movement, this shock-absorber being characterised in that it comprises in combination a fixed piston and a fixed cylinder cooperating both with a movable member.

According to another feature characterising this invention, the movable member consists of two axially aligned portions, the upper portion comprising a cylindrical cavity receiving the fixed piston, the lower portion having the configuration of a piston slidably engaged in the fixed cylinder.

The advantages resulting from this arrangement lie essentially in that the guiding surfaces of the movable member of this shock absorber, with respect on the one hand to the fixed piston and on the other hand to the fixed cylinder, are relatively large, thus affording a substantial increment in the efforts exerted on the assembly in a direction at right angles to the longitudinal axis of this assembly.

Another advantage characterizing the present invention consists in reducing considerably the overall dimensions of the shock absorber, notably in the transverse direction. In fact, with this construction, one of the chambers containing the throttling fluid constitutes the fixed cylinder, and the other chamber consisting of the movable member is disposed externally and in axial alignment with respect to said fixed cylinder. Thus, given a same volume of fluid to be transferred, the diameter of the cylinder known in the present state of the art is necessarily greater than the diameter of the cylinder or of the movable member of the shock absorber according to the present invention.

DESCRIPTION OF THE PREFERRED EMBODIMENT

Figure 1:
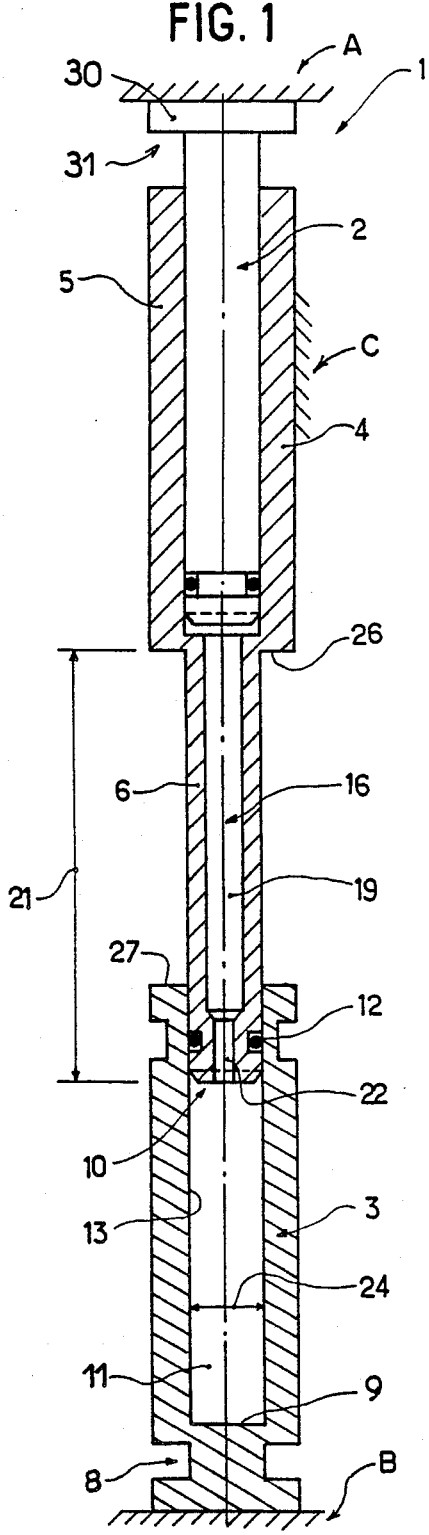
FIG. 1 is a diagrammatic, elevational and sectional view of the shock absorber according to the invention, in which the movable member is in its upper position.

Since the two Figures of the drawing illustrate the same shock absorber in two different positions, it is clear that the same reference numerals applies to the same component elements in both Figures, so that the two Figures can be regarded as complementary to each other.

The shock absorber 1 according to the present invention is of the double-acting type and based on the principle of the throttling of a fluid passing through a narrow passage for the purpose of slowing down a movement. The fluid may be liquid or gaseous, and its specific nature will be determined as a function of the damping force required for the application contemplated. Other factors may be considered when selecting the proper fluid. Thus, a gas may be preferred when it is desired to impart the properties of a spring to the shock absorber under certain forms of bias.

According to the invention, the shock absorber 1 consists of the combination of a fixed piston 2 with a fixed cylinder 3, both adapted to cooperate with a movable member 4. This movable member is disposed between the fixed piston 2 and the fixed cylinder 3 and comprises for this purpose two axially aligned portions 5, 6.

The upper portion 5 of this movable member 4 comprises a cylindrical cavity 7 in which the fixed piston 2 is fitted. In contrast thereto, the lower portion 6 of this movable member 4 has the configuration of a piston slidably engaged in the fixed cylinder 3. It will be seen that the fixed cylinder 3 is provided at its lower end with a bottom wall or inner end surface 9 adapted to form with the end 10 of the lower portion 6 of the movable member 4 a chamber 11 containing the liquid or gaseous fluid.

To ensure a proper operation of the shock absorber it is essential to avoid any leakage of the fluid contained in chamber 11 to the outside. For this purpose, the bottom 10 of the lower portion 6 of movable member 4 is provided with means, such as packings, scraper rings or the like, engaging the inner surface 13 of the fixed cylinder 3. Whatever the type of sealing means 12 implemented, they must compulsorily permit the sliding movement of the lower portion 6 in the fixed cylinder 3 with a minimum frictional contact to avoid any stray or undesired effect in the operation of the shock absorber 1.

Since the cavity 7 formed in the upper portion 5 of movable member 4 is also filled with throttling fluid, a fluid-tightness as efficient as in the above-mentioned case must be obtained in the area where the fixed piston 2 is slidably fitted in said cavity 7. To this end, the lower end 14 of fixed pistion 2 is provided with sealing means 12 comprising the inner surface 15 of this cavity 7.

Figure 3:
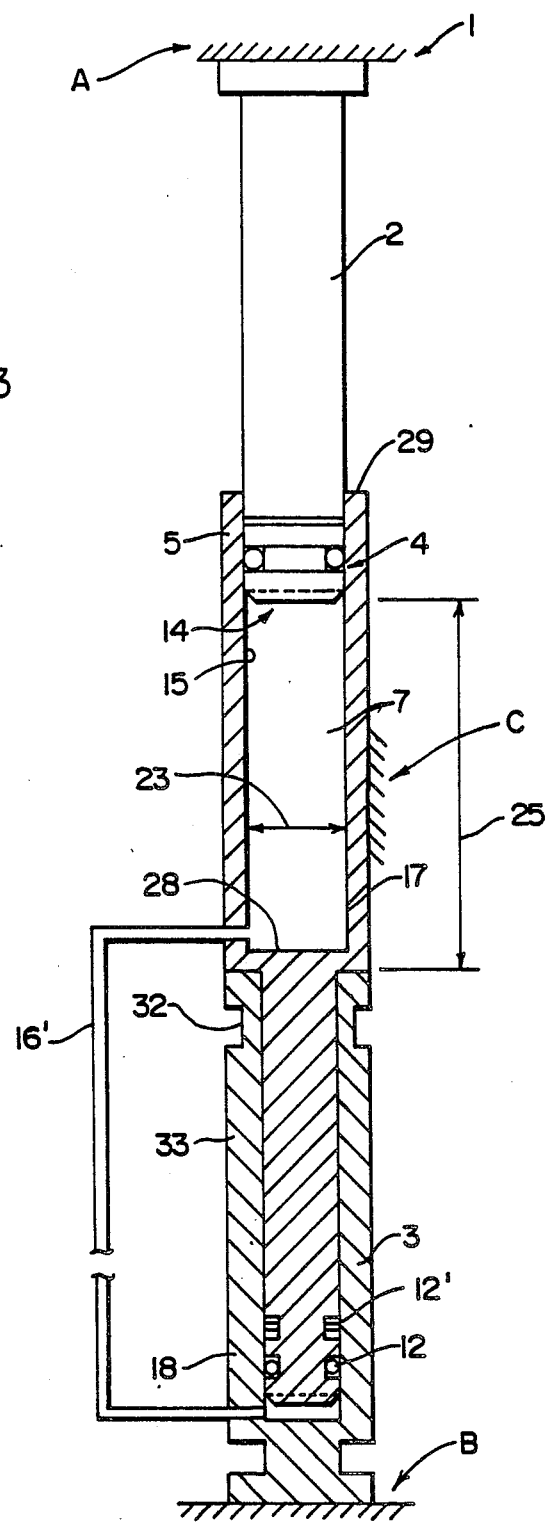
FIG. 3 is a view similar to FIG. 2 but showing a variation of the shock absorber according to present invention.

By reason of its principle of operation, the shock absorber 1 is provided with means 16 for interconnecting the cavity 7 and the chamber 11 to permit the transfer of the fluid contained in said cavity and said chamber. These communication means 16 may be disposed externally and consist of conduit 16, shown in FIG. 3, interconnecting the cavity 7 and chamber 11. In this case, the upper portion 5 of the movable member 4 and the cylinder 3 have each formed in their respective walls 17, 18 an orifice opening into the cavity 7 and chamber 11, respectively, these orifices being in close vicinity of the bottom (28, 9) thereof. These orifices permitting the flow of throttling fluid are connected to the above-mentioned conduit.

However, such external communication means are most liable to prove cumbersome in certain applications of the shock absorber 1. To cope with this inconvenience and according to the present invention, the lower portion 6 of movable member 4 comprises means 16 permitting the transfer of fluid to and from cavity 7 and chamber 11. These communication means 16 may advantageously consist of a central passage 19 formed in the lower portion 6 of the movable member 4 and opening on the one hand into the cavity 7 of the upper portion 5 and, on the other hand, into the chamber 11 of fixed cylinder 3.

It is stated hereinabove that the mode of operation of the shock absorber 1 is based on the principle of throttling a fluid flowing through a constricted passage. For this purpose, by reducing adequately the inner diameter 20 of the central cavity 19, this cavity may act as the throttling means through which the fluid can be transferred from cavity 7 to chamber 11 or vice versa.

However, it may happen that, owing to the length 21 of the lower portion 6 of said movable member 4, the machining of the central cavity 19 of reduced diameter is particularly difficult. Under these conditions, it may be preferable to increase the diameter 20 of this central cavity 19, the throttling effect being obtained in this case by an orifice 22 of smaller diameter, which extends from the lower end of said central cavity 19 and opens into the chamber 11 of the fixed cylinder 3. This configuration is advantageous notably when practical tests prove that the diameter of the orifice 22 must be readjusted as a function of the viscosity of the fluid, of the efforts exerted on the shock absorber 1 and of the desired damping effect.

In the form of embodiment illustrated in the drawing the diameter 23 of cavity 7 and the diameter 24 of chamber 11 are substantially identical. With this characteristic the shock absorber 1 is prevented from acting as a spring during the movement of the movable member 4.

However, in certain cases it may be advantageous to impart such spring-like properties to the shock absorber 1. For this purpose, it is only necessary to give different diameters 23, 24 to the cavity 7 and chamber 11, respectively as shown, for example, in FIG. 3.

The length of the stroke performed by the movable member 4 with respect to the fixed piston 2 and fixed cylinder 3 is subordinate on the one hand to the height of cavity 7 and to the length of fixed piston 2, and on the other hand to the height of chamber 11 and to the length of the lower portion 6 of movable member 4. This stroke length of movable member 4 is also subordinate to the spacing 25 existing between the fixed piston 2 and the fixed cylinder 3. Due to the variability of this spacing 25, the shock absorber 1 has a certain degree of polyvalence and can be adapted to various mechanical systems.

Figure 2:
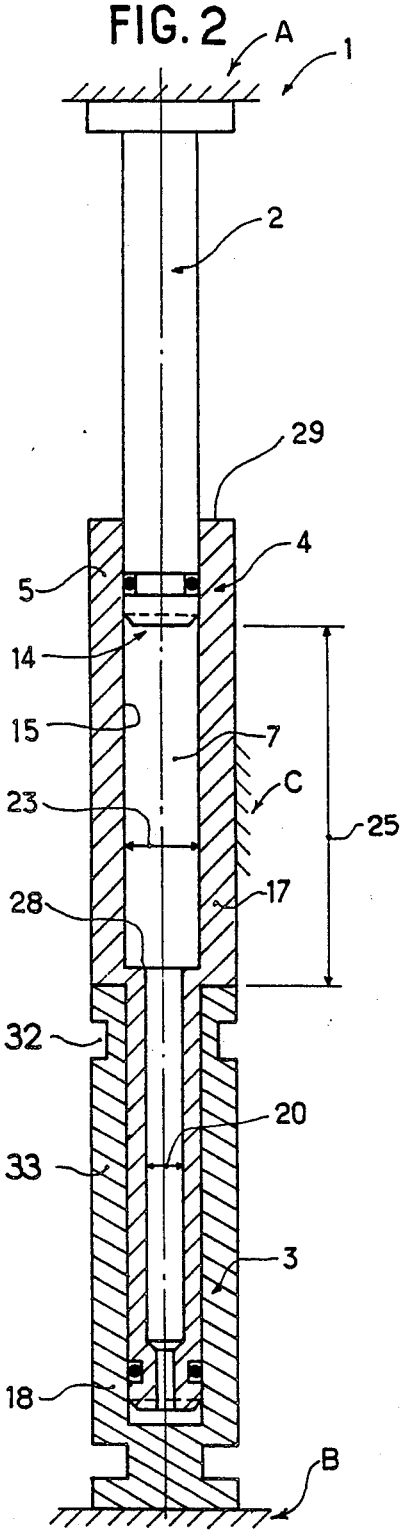
FIG. 2 is a view similar to FIG. 1 but showing the movable member in its position of maximum engagement in the fixed cylinder.

The stop means limiting the stroke of movable member 4 with respect, on the one hand, to the fixed piston 2 and, on the other hand, to the fixed cylinder 3, according to the specific functions to be devolved to the shock absorber 1, are either of mechanical nature or based on the principle of the compression of fluids. Thus, by modifying the volume of cavity 7 in relation to the volume of chamber 11, the specific nature of the limit stops will depend on the compressibility of the fluid employed in the device. In contrast thereto, in the form of embodiment illustrated in the drawing the limit stops are of mechanical type. Thus, in FIG. 2, showing the movable member 4 in its lowermost position, the shoulder 26 separating the bottom of the upper portion 5 from the lower portion of this movable member 4 abuts the top surface 27 of the fixed cylinder 3. On the other hand, in FIG. 1, the movable member 4 is moved to its uppermost position and the bottom 28 of cavity or inner end surface 7 cooperates with the bottom surface 14 of the fixed piston 2. It may also be contemplated to provide the upper portion of this fixed piston 2 with a flange cooperating with the top surface 29 of the movable member 4 at the end of the upward stroke thereof.

Since the cavity 7 is separated from chamber 11, the shock absorber 1 can be constructed with a particularly reduced cross-sectional area and adapted to precision mechanical systems. However, it will be seen that this shock absorber should not be construed as being limited to this type of application.

In fact, the shock absorber 1 according to the present invention may easily be incorporated in any desired mechanical system, by simply providing the fixed piston 2, the fixed cylinder 3 and the movable member 4 with suitable coupling means to thereby attach the piston, cylinder and movable means to parts A, B, and C respectfully.

Thus, in the case of the fixed piston 2, these coupling means may consist for example of a cylindrical flange 30 formed on or fixed to the upper end 31 of piston 2, and capable of cooperating with any suitable means for holding the mechanical system in which it is desired to incorporate the shock absorber 1. Of course, if desired a screw-threaded stud may be substituted for the flange 30, according to the structure frequently encountered in the case of shock absorbers for land vehicles.

Regarding the means for securing the fixed cylinder 3, they may consist simply of peripheral or annular grooves 32 machined in the outer surface 33 of the cylinder and engageable by gripping or clipping means. As mentioned in the foregoing, a threaded stud extending in axial alignment from the bottom end 8 of the fixed cylinder may be substituted for said peripheral or annular grooves 32.

More generally, the fixed piston 2, the fixed cylinder 3 and/or the movable member 4 may be provided with any coupling or fixation means which are deemed proper by one of ordinary skill in the art, as a function of the mechanical system in which the shock absorber 1 is to be used.

What is claimed is:

1. A double-acting shock absorber comprising:
   (a) a piston to be fixed to a first part;
   (b) a cylinder being always axially spaced from said fixed piston, said cylinder to be fixed to a second part; and
   (c) a movable member in axial alignment with and functionally engaged with both said fixed piston and said fixed cylinder, said movable member comprising:
      (i) a first portion having a substantially cylindrical cavity within which said fixed piston is slidably engaged; and
      (ii) a second portion functionally configured as a piston slidably engaged within said fixed cylinder.

2. The double-acting shock absorber of claim 1 wherein said fixed cylinder comprises an inner side surface and an inner end surface which, together with said second portion of said movable member, form a chamber containing a throttling fluid, said shock absorber further comprising means for permitting said throttling fluid to communicate between said chamber and said cavity of said first portion of said movable member, including a passage which is constricted in relation to said cavity and said chamber.

3. The double-acting shock absorber of claim 2 wherein said cavity and said chamber each have a cylindrical cross-section of substantially equal diameter.

4. The double-acting shock absorber of claim 2 wherein said cavity and said chamber each have a cylindrical cross-section of different diameters.

5. The double-acting shock absorber of claim 1 further comprising means external of said fixed cylinder and said movable member for communicating a throttling fluid between said cavity of said first portion of said movable member and said chamber, said external means including a passage which is constricted in relation to said cavity and said chamber.

6. The double-acting shock absorber of claim 5 wherein said external means comprises a conduit, wherein said first portion of said movable member includes a wall through which an end of said conduit extends for communicating said conduit with said cavity, and wherein said fixed cylinder comprises a wall through which a further end of said conduit extends for communicating said conduit with said chamber.

7. The double-acting shock absorber of claim 6 wherein said chamber comprises an inner end surface remote from said fixed piston and said cavity comprises an inner end surface remote from said fixed piston, wherein said conduit communicates between said chamber and said cavity proximate their respective inner end surfaces.

8. The double-acting shock absorber of claim 1 wherein said second portion of said movable member comprises a central passage, substantially axially aligned with said fixed cylinder, for permitting said throttling fluid to communicate between said chamber and said cavity.

9. The double-acting shock absorber of claim 8 wherein said central passage includes passage which is constricted in relation to said cavity and said chamber.

10. The double-acting shock absorber of claim 9 wherein said constricted passage opens into said chamber, and wherein said constricted passage is constricted in relation to the remainder of said central passage.

11. The double-acting shock absorber of claim 1 further comprising means for sealing said fixed piston against the inner surface of said cavity and means for sealing said second portion of said movable member against the inner surface of said chamber.

12. The double-acting shock absorber of claim 11 wherein either of said sealing means comprises a ring having a substantially circular cross-section.

13. The double-acting shock absorber of claim 11 wherein either of said sealing means comprises packings.

14. The double-acting shock absorber of claim 11 wherein each of said sealing means comprises a ring having a substantially circular cross-section.

15. The double-acting shock absorber of claim 11 wherein each of said sealing means comprises packings.

16. The double-acting shock absorber of claim 11 wherein either of said sealing means comprises scraper rings.

17. The double-acting shock absorber of claim 11 wherein each of said sealing means comprises scraper rings.

18. The double-acting shock absorber of claim 1 wherein said cavity has a predetermined length, wherein said chamber has a predetermined length, wherein said second portion of said movable member has a predetermined length, and wherein said fixed cylinder has a predetermined length, wherein said fixed piston has an end closest to said fixed cylinder which is spaced from an end of said fixed cylinder closest to said fixed piston by a predetermined amount, and wherein said shock absorber has a stroke which is dependent upon said predetermined lengths and said predetermined amount.

19. The double-acting shock absorber of claim 1 wherein said fixed piston comprises means for attachment to said first part, and wherein said fixed cylinder comprises means for attachment to said second part.

20. The double-acting shock absorber of claim 1 further comprising a constricted passage for communicating a throttling fluid between said cavity and said fixed cylinder for damping movement between said first part and said second part.

21. A shock absorber for attachment between first and second relatively movable members, said shock absorber comprising:

(a) a piston to be fixed relative to said first member;
(b) a cylinder to be fixed relative to said second member and comprising a chamber, one end of said chamber being defined by an inner end surface of said cylinder, wherein said piston does not extend within said chamber; and
(c) a movable member comprising:
  (i) a first portion having a substantially cylindrical cavity within which said piston is slidably engaged; and
  (ii) a second portion slidably engaged within said cylinder.

22. The shock absorber of claim 21 wherein said cylinder comprises an inner side surface and an inner end surface which, together with said second portion of said movable member, form a chamber containing throttling fluid, said second portion of said movable member further comprising an axially extending passage permitting said throttling fluid to communicate between said chamber and said cavity.

23. A shock absorber for attachment between first and second relatively movable members, said shock absorber comprising:
(a) a piston to be fixed relative to said first member;
(b) a cylinder to be fixed relative to said second member; and
(c) a movable member comprising:
  (i) a first portion having a substantially cylindrical cavity within which said piston is slidably engaged; and
  (ii) a second portion slidably engaged within said cylinder;
wherein said piston, said cylinder, and said movable member are axially arranged such that said movable member is axially intermediate said piston and said cylinder: and
wherein the cylinder is always axially spaced from said piston 24. The shock absorber of claim 23 wherein said cylinder comprises an inner side surface and an inner end surface which, together with said second portion of said movable member, form a chamber containing throttling fluid, said second portion of said movable member further comprising an axially extending passage permitting said throttling fluid to communicate between said chamber and said cavity.

25. A double-acting shock absorber comprising:
(a) a piston to be fixed to a first part;
(b) a cylinder being axially spaced from said fixed piston, said cylinder to be fixed to a second part; and
(c) a movable member in axial alignment with and functionally engaged with both said fixed piston and said fixed cylinder, said movable member comprising:
  (i) a first portion having a substantially cylindrical cavity within which said fixed piston is slidably engaged; and
  (ii) a second portion functionally configured as a piston slidably engaged within said fixed cylinder, wherein said fixed cylinder comprises an inner side surface and an inner end surface which, together with said second portion of said movable member, form a chamber containing a throttling fluid, said shock absorber further comprising means for permitting said throttling fluid to communicate between said chamber and said cavity of said first portion of said movable member, including a passage which is constricted in relation to said cavity and said chamber.

26. A double-acting shock absorber comprising:
(a) a piston to be fixed to a first part;
(b) a cylinder being axially spaced from said fixed piston, said cylinder to be fixed to a second part; and
(c) a movable member in axial alignment with and functionally engaged with both said fixed piston and said fixed cylinder, said movable member comprising:
  (i) a first portion having a substantially cylindrical cavity within which said fixed piston is slidably engaged; and
  (ii) a second portion functionally configured as a piston slidably engaged within said fixed cylinder; and
(d) means external of said fixed cylinder and said movable member for communicating a throttling fluid between said cavity of said first portion of said movable member and said chamber, said external means including a passage which is constricted in relation to said cavity and said chamber.

27. A double-acting shock absorber comprising:
(a) a piston to be fixed to a first part;
(b) a cylinder being axially spaced from said fixed piston, said cylinder to be fixed to a second part; and
(c) a movable member in axial alignment with and functionally engaged with both said fixed piston and said fixed cylinder, said movable member comprising:
  (i) a first portion having a substantially cylindrical cavity within which said fixed piston is slidably engaged; and
  (ii) a second portion functionally configured as a piston slidably engaged within said fixed cylinder, wherein said second portion of said movable member comprises a central passage, substantially axially aligned with said fixed cylinder, for permitting said throttling fluid to communicate between said chamber and said cavity.

28. A double-acting shock absorber comprising:
(a) a piston to be fixed to a first part;
(b) a cylinder being axially spaced from said fixed piston, said cylinder to be fixed to a second part; and
(c) a movable member in axial alignment with and functionally engaged with both said fixed piston and said fixed cylinder, said movable member comprising:
  (i) a first portion having a substantially cylindrical cavity within which said fixed piston is slidably engaged; and
  (ii) a second portion functionally configured as a piston slidably engaged within said fixed cylinder; and
(d) a constricted passage for communicating a throttling fluid between said cavity and said fixed cylinder for damping movement between said first part and said second part.

29. A shock absorber for attachment between first and second relatively movable members, said shock absorber comprising:
(a) a piston to be fixed relative to said first member;
(b) a cylinder to be fixed relative to said second member; and
(c) a movable member comprising:

(i) a first portion having a substantially cylindrical cavity within which said piston is slidably engaged; and
(ii) a second portion slidably engaged within said cylinder;

wherein said piston, said cylinder, and said movable member are axially arranged such that said movable member is axially intermediate said piston and said cylinder; and wherein said cylinder comprises an inner side surface and an inner end surface which, together with said second portion of said movable member, form a chamber containing throttling fluid, said second portion of said movable member further comprising an axially extending passage permitting said throttling fluid to communicate between said chamber and said cavity.

* * * * *